United States Patent [19]
Köhler et al.

[11] Patent Number: 5,852,098
[45] Date of Patent: Dec. 22, 1998

[54] SHORT GLASS-FIBRE REINORCED POLYCARBONATES

[75] Inventors: Burkhard Köhler, Leverkusen; Klaus Horn, Dormagen; Jan Mazanek, Köln; Karl-Heinz Käsler, Bergisch Gladbach, all of Germany

[73] Assignee: Bayer AG, United Kingdom

[21] Appl. No.: 629,366

[22] Filed: Apr. 8, 1996

[30] Foreign Application Priority Data

Apr. 21, 1995 [DE] Germany .................. 19 51 4770.7

[51] Int. Cl.$^6$ .................. C08J 5/10; C08K 3/40; C08L 69/00
[52] U.S. Cl. .................. 524/494; 524/492; 524/493
[58] Field of Search .................. 524/492, 493, 524/494, 506

[56] References Cited

U.S. PATENT DOCUMENTS

| | | | |
|---|---|---|---|
| 4,147,707 | 4/1979 | Alewet et al. | 260/375 B |
| 4,358,556 | 11/1982 | Van Abeelen et al. | 524/267 |
| 4,393,161 | 7/1983 | Van Abeelen et al. | 524/506 |
| 4,568,712 | 2/1986 | Van Abeelen et al. | 524/267 |
| 5,322,882 | 6/1994 | Okamoto | 524/537 |

FOREIGN PATENT DOCUMENTS 25 18 287  11/1976  Germany .

OTHER PUBLICATIONS

Orbit Abstract of DE 25 18 287 Nov. 1, 1976.

*Primary Examiner*—James J. Seidleck
*Assistant Examiner*—U. K. Rajguru
*Attorney, Agent, or Firm*—Connolly & Hutz

[57] ABSTRACT

The present invention provides mixtures containing polycarbonates, short glass fibers and polyether silicones as well as a method for preparing these mixtures.

7 Claims, No Drawings

SHORT GLASS-FIBRE REINORCED POLYCARBONATES

The invention relates to mixtures of short glass-fibre reinforced polycarbonates and polyether silicones which are distinguished by an improved toughness.

DE-OS 2 518 287 describes the improvement of the mechanical values of glass-fibre reinforced polycarbonates by OH-terminated silicones. With the use of 2 wt. % of these silicones, the impact strength of a compound having 20 wt % of short glass fibres could be improved to 80 kJ/m$^2$. This impact strength is not however sufficient for many applications.

The object was therefore to produce short glass-fibre reinforced polycarbonates having an even greater toughness.

It has now been found that short glass-fibre reinforced polycarbonates containing small quantities of polyether silicones exhibit an improved impact strength as compared with prior art.

The invention therefore provides mixtures containing
A) from 45 to 97 wt. %, preferably from 68 to 94.5 wt. %, of polycarbonates,
B) from 2 to 50 wt. %, preferably from 5 to 30 wt. %, of short glass fibres and
C) from 0.1 to 5 wt. %, preferably from 0.5 to 2 wt. %, of polyether silicones, in each case referred to 100 wt. % of the sum of the components A)+B)+C).

Component A)

The thermoplastic polycarbonates suitable according to the invention constituting component A) can be both homopolycarbonates and copolycarbonates from the diphenols of formula (1)

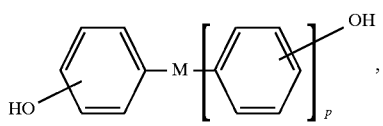
(1)

wherein
p is 1 or zero and
M can be a single bond, $C_1$–$C_5$ alkylene, $C_2$–$C_5$ alkylidene, optionally $C_5$–$C_6$ cycloalkylidene substituted by methyl groups, —O—, —S— and —SO$_2$—.

The polycarbonates appropriate as component A) can be both linear and branched, they can contain aromatically bonded methyl groups and are free from halogen. The polycarbonates of component A) can be used both separately and as a mixture.

The diphenols of formula (1) are either known in the literature or are obtainable by methods known in the literature. The preparation of the polycarbonates suitable according to the invention constituting component A) is also known in the literature and can, for example, be carried out by the phase interface process using phosgene or by the process in homogeneous phase (the so-called pyridine process) using phosgene, with the molecular weight to be established in each case being attained in a known manner by an appropriate quantity of known chain stoppers.

Suitable diphenols of formula (1) are, for example, hydroquinone, resorcinol, 4,4'-dihydroxydiphenyl, 2,2-bis(4-hydroxyphenyl)propane (bisphenol A), 2,4-bis(4-hydroxyphenyl)-2-methylbutane, 2,2-bis(4-hydroxy-3,5-dimethylphenyl)propane, 1,1-bis(4-hydroxyphenyl)-cyclohexane or 1,1-bis(4-hydroxyphenyl)-3,3,5-trimethylcyclohexane. Preferred diphenols of formula (1) are 2,2-bis(4-hydroxyphenyl)propane and 1,1-bis(4-hydroxyphenyl)-3,3,5-trimethylcyclohexane. Mixtures of diphenols may also be used, for example, bisphenol A and up to 60 mol-% of 1,1-bis(4-hydroxyphenyl)-3,3,5-trimethylcyclohexane.

Examples of suitable chain stoppers are phenol or p-tert.-butylphenol, also long-chain alkylphenols such as 4-(1,3-tetramethylbutyl)phenol in accordance with DE-OS 2 842 005 or monoalkylphenols or dialkylphenols having a total of 8° to 20° C. atoms in the alkyl substituent in accordance with Deutsche Offenlegungsschrift 3 506 472, for example, p-nonylphenol, 2,5-di-tert.-butylphenol, p-tert.-octylphenol, p-dodecylphenol, 2-(3,5-dimethylheptyl)phenol and 4-(2,5-dimethylheptyl)phenol. The quantity of chain stoppers used is in general between 0.5 and 10 mol-%, referred to the sum of the diphenols (1) used in each case.

The polycarbonates suitable according to the invention constituting component A) can be branched in a known manner, in fact preferably by the incorporation of from 0.05 to 2.0 mol-%, referred to the sum of the diphenols used, of trifunctional or more than trifunctional compounds, for example, those having three or more than three phenolic OH groups.

The polycarbonates suitable according to the invention have average weight molecular weights $\overline{M}_w$ of from 10,000 to 200,000, preferably of from 20,000 to 80,000, measured, for example, by ultracentrifugation or measurement of light scattering.

Component B)

Short glass fibres are ground glass fibres having an average fibre length of from 150 $\mu$m to 300 $\mu$m, preferably of from 200 $\mu$m to 260 $\mu$m, in particular of 230 $\mu$m, a diameter of from 8 $\mu$m to 15 $\mu$m, preferably of 10 $\mu$m and a proportion of powder (less than 50 $\mu$m) of up to 10 wt. %. The preferred glass material is alkali-free aluminium borosilicate glass (E glass). The short glass fibres are preferably sized, for example, using the water size described in DE-AS 1 201 991.

Component C)

Polyether silicones contain dialkylsiloxane units, wherein preferably at least one alkyl group, particularly preferably two alkyl groups are methyl, as polysilicone and contain ethylene oxide units and/or propylene oxide units, wherein the polyether is chemically bonded to the polysilicones, as polyether.

The polyether silicones preferably correspond to formula (I)

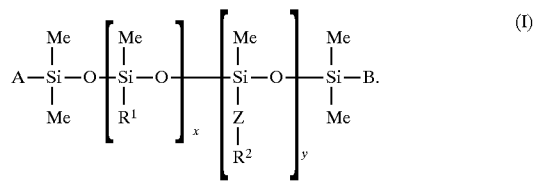
(I)

Wherein:
R$^1$ signifies an alkyl group having 1 to 30 C atoms, with up to 20 wt. % of these alkyl groups being replaceable by phenyl groups and/or aralkyl groups, which can in each case be substituted by one or more methyl groups, while the alkyl moieties of the aralkyl groups can contain 1 to 3 carbon atoms,
A signifies —CH$_3$ or R$^2$-Z- ,
B signifies —CH$_3$ or R$^2$-Z-,
R$^2$ signifies a polyether radical having an average molecular weight of from 200 to 3,000, preferably a polyethylene oxide radical or a polypropylene radical or a polyethylene oxide propylene oxide radical, which is terminated by $C_1$-$C_6$ alkoxy, OH—, ester or carbamate groups, Z signifies an alkylene group, which bonds the silicon atom to the group $R^2$, preferably a 1,3-propylene group, —$CH_2$—$CH_2$—$CH_2$—, x represents 1 to 20, preferably 2 to 7, y represents 0 to 50, preferably 1 to 20, wherein the average molecule contains a group $R^2$-Z- and the ratio of the number of groups $R^2$-Z- to the number x amounts to 1:2 to 1:40.

When A and B each represent a group $R^2$-Z-, it is useful that y represent 0. Here it is again preferred that the ratio of the number of groups $R^2$-Z- to the number x is in the range of from 1:3 to 1:40, preferably from 1:3 to 1:15.

When A and B each represent the group —$CH_3$, y is usefully a number of from 1 to 20. In this case it is preferred that the ratio of the number of groups $R^2$-Z- to the number x is in the range of from 1:2 to 1:7. This type is particularly preferred.

To prepare the silicones (I) to be used according to the invention, functional siloxanes, such as are represented, for example, by the following formulae (II) to (VI) (cf. EP-A 0 083 733), can be reacted:

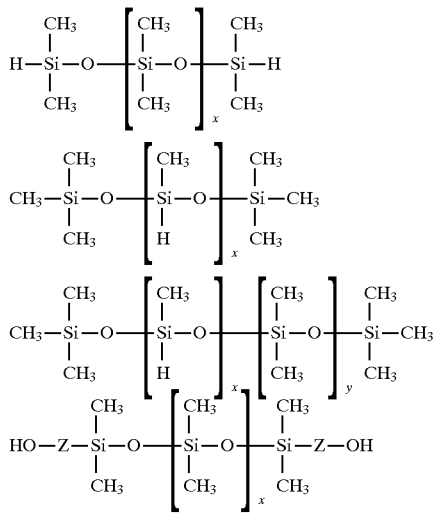

Product (V) is obtainable by hydrosilylation of (II) with allyl alcohol. Z is then 1,3-propylene.

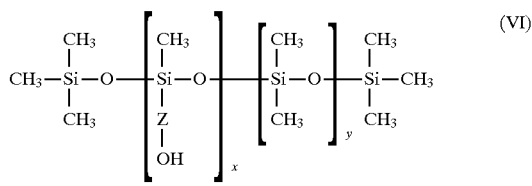

Product (VI) is obtainable by hydrosilylation of (IV) with allyl alcohol. Z is then again 1,3-propylene.

The polyether-grafted silicones of formula (I) may or may not contain in addition OH groups.

The silicones of formula (I) are on the one hand obtainable by hydrosilylation reactions of the SiH functional siloxanes of the formulae (II) or (III) or (IV) with polyethers of formula (VII)

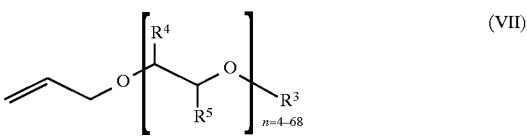

wherein $R^4$ and $R^5$ represent hydrogen or $C_1$-$C_6$ alkyl and one of the radicals $R^4$ or $R^5$ must be hydrogen and $R^3$ represents $C_1$-$C_6$ alkyl, $C_7$-$C_{14}$ aralkyl, $C_6$-$C_{14}$ aryl, an acyl radical or carbamoyl radical.

The polyethers of formula (VII) themselves are obtainable by anionic polymerisation of ethylene oxide and/or propylene oxide, started on allyl alcohol and subsequent reaction with alkylating or acylating reagents or with isocyanates, or started on saturated alcohols or phenols and subsequent reaction with allyl halides.

The polyether-grafted silicones of formula (I) are on the other hand obtainable by anionic polymerisation of ethylene oxide and/or propylene oxide, started on hydroxyfunctional siloxanes of the formulae (V) or (VI) and subsequent reaction with alkylating or acylating reagents or with isocyanates.

The silicones prepared in this manner have no OH groups.

The reaction of the siloxanes (II), (III) or (IV) with polyethers of formula (VII) wherein $R^3$ is H leads not only, via addition of the vinyl group of (VII) to the Si—H bonds of (II), (III) or (IV), to compounds of formula (I) having OH groups but also, by reaction of the OH group of (VII) with the Si—H bonds of (II), (III) or (IV) accompanied by evolution of hydrogen, to more highly branched polyether silicones having a higher molecular weight than that of the compounds (I).

These branched polyether silicones are particularly preferred components C).

Free OH groups still present in these branched polyether silicones can be esterified in a conventional manner, for example using acetyl chloride.

The preparation of the mixtures of components A), B) and C) according to the invention is carried out in the melt, preferably in kneaders or extruders at temperatures of from 220° C. to 340° C.

The present invention therefore also provides a method for the preparation of the mixtures according to the invention, which is characterised in that the components A), B) and C) are mixed in the melt, preferably in kneaders or extruders, at temperatures of from 220° C. to 340° C.

The mixtures according to the invention can be processed in a known manner to form any kinds of moulded bodies.

These moulded bodies are used everywhere where hitherto glass-fibre reinforced polycarbonates have been used, that is, for example, for articles in the fields of electrical equipment, domestic appliances and automobile manufacture.

EXAMPLES

I. The components

IA. Polycarbonate from 2,2-bis(4-hydroxyphenyl) propane having a relative solution viscosity of 1.28 (measured in 0.5% $CH_2Cl_2$ solution at 25° C.).

IB. E glass fibres (short glass fibres) having an average fibre length of 230 μm, a diameter of 10 μm and a proportion of powder (less than 50 μm) of 5 wt. % (standard commercial product).

IC. Polyether silicone of formula (I) wherein $R^1$, A and B are $CH_3$, wherein x=1, y=3 and having a polyether radical $R^2$ consisting of 13 ethylene oxide units and 4 propylene oxide units. The polyether silicone is slightly branched via the OH group of the polyether segment.

This polyether silicone is prepared as follows:

A mixture comprising 862 g of the polyether allyl-(—O—CH$_2$—CH(CH$_3$)—)$_4$—(—O—CH$_2$—CH$_2$—)$_{13}$—OH and 364 g of a siloxane of formula (IV) wherein x=1 and y=3 and 0.025 g of hexachloroplatinic acid is heated at 110° C. for 24 hours with vigorous stirring.

Example 1

79 wt. % of component IA) together with 20 wt. % of component IB) and 1 wt. % of component IC) are mixed at 280° C. on a ZSK 32 and granular material is prepared in a known manner. The impact strength of standard small rods of this granular material is measured in a known manner (DIN 53453). Result: not broken.

Comparative Example in accordance with DE-OS 2 518 287

The procedure is as in Example 1, but 1 wt. % of an OH-terminated polydimethylsiloxane having a molecular weight of 2,740 g/mol is used as component C), in accordance with the instructions of DE-OS 2 518 287. This silicone is prepared by the reaction of 200 ml of octamethylcyclotetrasiloxane with 37 g of concentrated H$_2$SO$_4$ in 100 ml of diethyl ether for 24 hours at room temperature. The working up is carried out by extracting with water, drying over K$_2$CO$_3$ and removal of readily volatile components at 310° C.

Standard small rods obtained from the granular material have an impact strength according to DIN 53453 of 80 kJ/m$^2$.

Comparative Example without addition of Silicone

As in Example 1, 80 wt. % of component IA) is mixed with 20 wt. % of component IB). The impact strength according to DIN 53453 is 59 kJ/m$^2$.

We claim:

1. A mixture comprising
A) 45 to 97 wt. % of polycarbonate,
B) 2 to 50 wt. % of short glass fibers, and
C) 0.1 to 5 wt. % of polyether silicone of the formula (I):

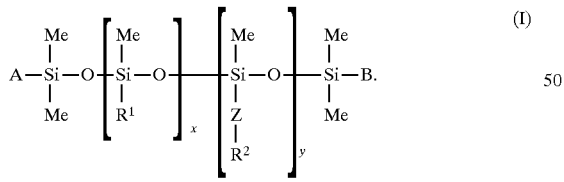

wherein:
R$^1$ signifies an alkyl group having 1 to 30 C atoms, wherein up to 20 wt. % of the alkyl groups can be replaced by phenyl groups and/or aralkyl groups, which groups can be substituted by one or more methyl groups, while the alkyl moieties of the aralkyl groups can contain 1 to 3 carbon atoms,
A signifies —CH$_3$ or R$^2$-Z-,
B signifies —CH$_3$ or R$^2$-Z-,
R$^2$ signifies a polyether radical having an average molecular weight of from 200 to 3,000, which is terminated by C$_1$–C$_6$ alkoxy, OH—, ester or carbamate groups,
Z signifies an alkylene group, which bonds the silicon atom to the group R$^2$,
x represents 1 to 20,
y represents 0 to 50, and
wherein the average molecule contains a group R$^2$-Z- and the ratio of the number of groups R$^2$-Z- to the number x amounts to 1:2 to 1:40;
in each case based on 100 wt. % of A)+B)+C).

2. The mixture of claim 1, wherein R$^2$ is a polyethylene oxide radical, a polypropylene radical, or a polyethylene oxide propylene oxide radical.

3. The mixture of claim 1, wherein Z is a 1,3-propylene group.

4. The mixture of claim 1, wherein x represents 2 to 7.

5. The mixture of claim 1, wherein y represents 1 to 20.

6. The mixture of claim 1, prepared by melt-mixing components A), B) and C) at temperatures of 220to 340degrees C.

7. A mixture consisting of
A) 45 to 97 wt. % of polycarbonate,
B) 2 to 50 wt. % of short glass fibers, and
C) 0.1 to 5 wt. % of polyether silicone of the formula (I):

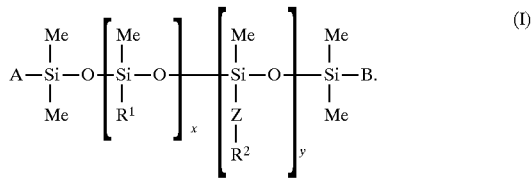

wherein:
R$^1$ signifies an alkyl group having 1 to 30 C atoms, wherein up to 20 wt. % of the alkyl groups can be replaced by phenyl groups and/or aralkyl groups, which groups can be substituted by one or more methyl groups, while the alkyl moieties of the aralkyl groups can contain 1 to 3 carbon atoms,
A signifies —CH$_3$ or R$^2$-Z-,
B signifies —CH$_3$ OR R$^2$-Z-,
R$^2$ signifies a polyether radical having an average molecular weight of from 200 to 3,000, which is terminated by C$_1$–C$_6$ alkoxy, OH—, ester or carbamate groups,
Z signifies an alkylene group, which bonds the silicon atom to the group R$^2$,
x represents 1 to 20,
y represents 0 to 50, and
wherein the average molecule contains a group R$^2$-Z- and the ratio of the number of groups R$^2$-Z- to the number x amounts to 1:2 to 1:40;
in each case based on 100 wt. % of A)+B)+C).

* * * * *

UNITED STATES PATENT AND TRADEMARK OFFICE
CERTIFICATE OF CORRECTION

PATENT NO. : 5,852,098
DATED : December 22, 1998
INVENTOR(S) : Burkhard Kohler et al.

It is certified that error appears in the above-identified patent and that said Letters Patent is hereby corrected as shown below:

On the title page item 54

In the Title

Change "Short Glass-Fibre Reinorced Polycarbonates" to -- Short Glass-Fibre Reinforced Polycarbonates --.

In the Assignee Designation

Change "Bayer AG, United Kingdom" to -- Bayer AG, Germany --.

In the Claims

Claim 6, lines 2-3 (col. 6, lines 24-25), change "220to340degrees C" to -- 220 to 340 degrees C --.

Signed and Sealed this

Twenty-fifth Day of May, 1999

Attest:

Q. TODD DICKINSON

*Attesting Officer*     *Acting Commissioner of Patents and Trademarks*